US006523888B1

(12) United States Patent
Yan et al.

(10) Patent No.: US 6,523,888 B1
(45) Date of Patent: Feb. 25, 2003

(54) INTEGRATED LIGHT AND GRAB RAIL ASSEMBLY

(75) Inventors: Haithi Yan, Columbus, OH (US); Toshikazu Hirose, Dublin, OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/037,819

(22) Filed: Jan. 4, 2002

(51) Int. Cl.[7] .................................................. B60Q 3/02
(52) U.S. Cl. .......................... 296/215; 16/444; 362/490
(58) Field of Search ................................. 296/214, 215; 16/444; 362/488, 490, 493, 100

(56) References Cited

U.S. PATENT DOCUMENTS 3,840,250 A 10/1974 Bott
4,067,602 A 1/1978 Ahlisch et al.
4,073,036 A 2/1978 Bustin
4,266,318 A 5/1981 Dauwalder
4,794,668 A 1/1989 Lorence et al.
4,912,808 A 4/1990 Blakely
5,211,282 A * 5/1993 Ting ........................... 200/292
5,297,010 A 3/1994 Camarota et al.
5,325,275 A * 6/1994 Liu ............................ 362/322
5,366,127 A 11/1994 Heinz
5,519,917 A 5/1996 Cordonnier
5,632,061 A 5/1997 Smith et al.
5,756,167 A 5/1998 Tamura et al.
5,931,525 A 8/1999 Rickabus
6,050,631 A 4/2000 Suzuki et al.
6,076,233 A 6/2000 Sasaki et al.
6,095,469 A * 8/2000 Von Alman ................. 224/313
6,106,055 A 8/2000 Fischer
6,126,231 A 10/2000 Suzuki et al.
6,199,942 B1 3/2001 Carroll, III et al.
6,234,526 B1 5/2001 Song et al.
6,273,593 B1 * 8/2001 Yabata et al. ............... 362/487

* cited by examiner

*Primary Examiner*—D. Glenn Dayoan
*Assistant Examiner*—Patricia L. Engle
(74) *Attorney, Agent, or Firm*—Rankin, Hill, Porter & Clark LLP

(57) ABSTRACT

An integrated grab rail and map light assembly including a handle portion that is secured to a vehicle roof by first and second mounting members disposed adjacent first and second ends of the handle portion, respectively. A light receptacle extends from a second end of the handle portion and has a light assembly disposed therein. The light assembly is covered by a lens that also covers the second mounting member. The lens is pushed to actuate the light assembly.

15 Claims, 2 Drawing Sheets

14
10
20b
44
20a
18
25
20
24
22
26

10
14
44
25
24
20b
20
20a
18
22
26
13a
18a
28
34
42
40
30
38
18b
32
13a
20
50
56
54
58
76
60
62
48
16
70
68
72
66
74
25
64
13

INTEGRATED LIGHT AND GRAB RAIL ASSEMBLY

BACKGROUND OF THE INVENTION

1. Field of the Invention

The present invention is directed toward a grab rail and, more specifically, toward an automobile grab rail that includes a map light.

2. Description of Related Art

Grab rails are provided in automobiles to assist the occupants in exiting the vehicle and, as such, are traditionally secured to a roof of the vehicle. Although grab rails may be provided for the front seat passengers, they are more commonly provided for the rear seat or third seat passengers in minivans and sport utility vehicles. Due to the position of the rear and third row seats relative to the doors, the grab rails are normally positioned relatively forward or in front of the rear/third row passengers. As a result of this position within the passenger compartment, it is necessary to design the grab rails to minimize damage to passengers as may occur during a vehicle collision. In response to this need, the grab rails have conventionally been designed to absorb impact energy by having either energy absorbing brackets or metal inserts that crush when predetermined impact loads are experienced.

It is further known in automobile design to provide map lights in convenient locations for the rear seat passengers. Such map lights may be independent units or may be incorporated into other roof-mounted devices, such as heat and air conditioning vents.

U.S. Pat. No. 5,297,010 teaches a grab bar that incorporates a light. The '010 grab bar is rigid, and is secured to an exterior surface of a vehicle adjacent a door. The light, which illuminates an area beneath the grab bar handle, is turned on by a switch that is disposed remote from the grab bar. Insofar as the light does not illuminate an area in front of the grab bar, the '010 grab bar is not useful as a map light for the vehicle interior. Moreover, the rigid construction of the '010 grab bar is incompatible with use inside a vehicle.

U.S. Pat. No. 5,366,127 teaches a grab rail that has a light assembly disposed therein. The light assembly includes a light bulb, a lens, and a switch for actuating the light that is remote from the lens. The '127 grab rail is a rigid structure that is not adapted to receive impact loads.

Accordingly, there exists a need in the art for an improved grab rail for use in a vehicle, wherein the grab rail incorporates a map light. There further exists a need in the art for a grab rail incorporating a map light that is selectively and directly actuatable by an occupant of the vehicle.

SUMMARY OF THE INVENTION

The present invention is directed toward an integrated grab rail and map light for use in a vehicle. The present invention is further directed toward a grab rail incorporating a map light, wherein the map light is selectively and directly actuatable by a vehicle occupant.

In accordance with the present invention, an integrated grab rail and light assembly that is adapted for securement to a vehicle roof is provided. The assembly includes a handle portion, a first mounting member disposed at a first end of the handle portion, and a second mounting member disposed at a second, opposite end of the handle portion. A light receptacle extends from the second end of the handle assembly and receives a light assembly.

In further accordance with the present invention, the first and second mounting members are secured to the vehicle roof. The first mounting member is disposed near an end of the integrated grab rail and light assembly and the second mounting member is disposed near a middle of the integrated grab rail and light assembly.

In further accordance with the present invention, the light receptacle receives a lens that covers the light assembly and the second mounting assembly. The light assembly is actuated by pushing the lens.

In further accordance with the present invention, a cushioning material is disposed between a lower surface of the light receptacle and the roof. A spacer wall extends from the light receptacle and through the cushioning material to space the light receptacle from the roof.

In further accordance with the present invention, the first mounting member includes a downwardly extending finger that extends into an opening in the roof and serves to position the first mounting member relative to the roof and stiffen the support of the integrated grab rail and light assembly. Similarly, the second mounting member includes a downwardly extending finger that extends into an opening in the roof and serves to position the second mounting member relative to the roof and stiffen the support of the integrated grab rail and light assembly.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figures 1, 3:
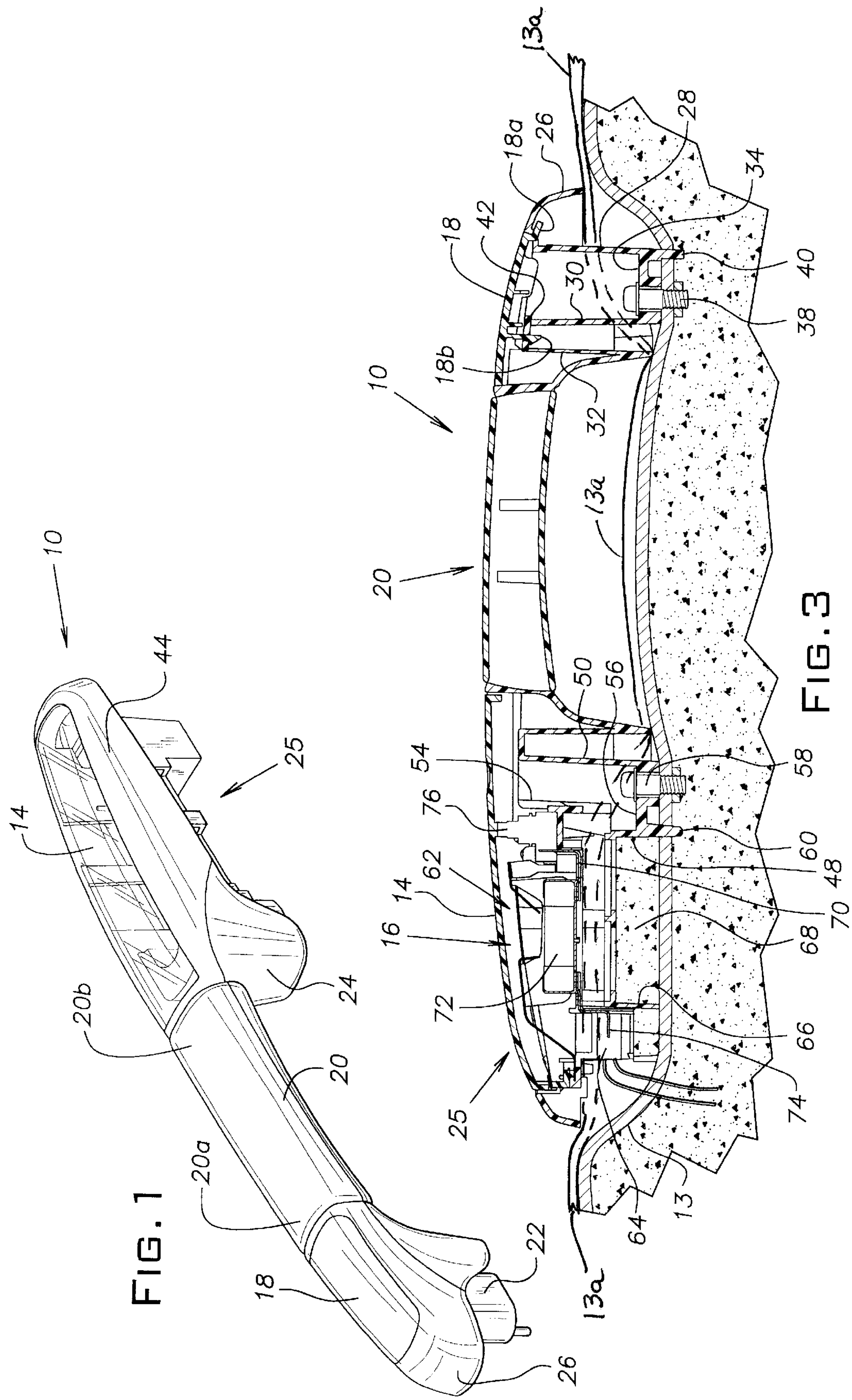
FIG. 1 is a perspective view of an integrated grab rail and map light according to the present invention.
Figure 2:
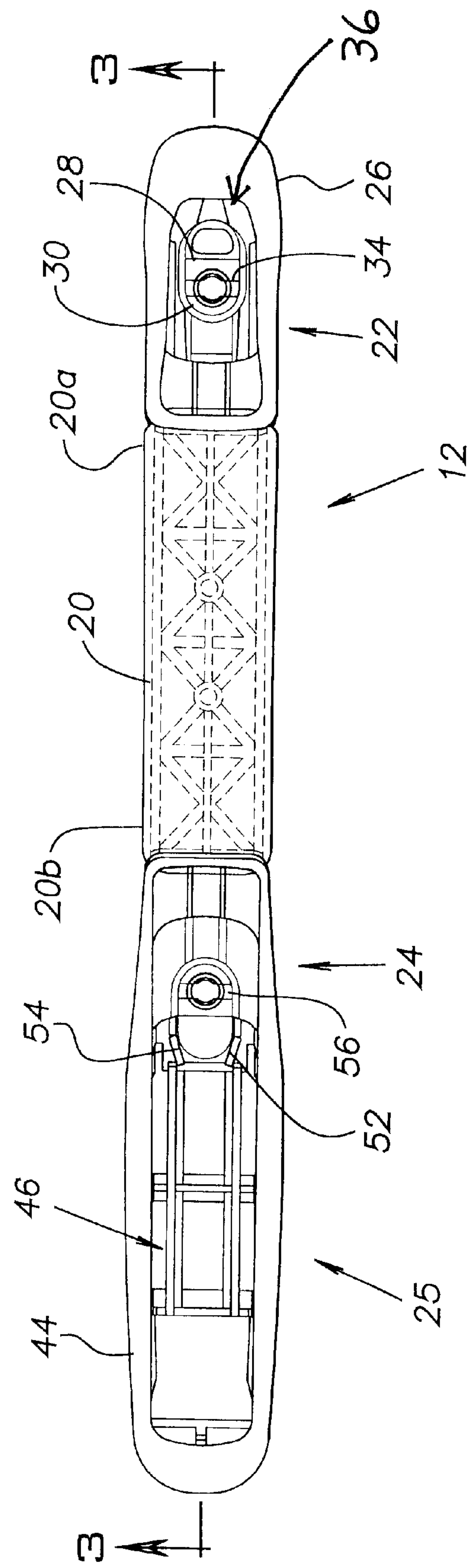
FIG. 2 is a top plan view of the integrated grab rail and map light with a cover, light assembly and lens removed for purposes of clarity; and, FIG. 3 is a cross sectional view of the grab rail and map light according to the present invention, shown mounted to a roof of a vehicle.

With reference to the drawing figures, an integrated light and grab rail assembly 10 according to the present invention is illustrated. The integrated assembly 10 includes a housing assembly 12, a lens 14, a light assembly 16, and a cover 18.

The housing assembly 12 includes an elongated handle portion 20, first and second mounting members 22, 24, and a light receptacle 25 that receives the light assembly 16. The elongated handle 20 is preferably molded from polypropylene in an injection molding process so as to provide a honeycomb or lattice type internal structure, as illustrated. This type of structure provides an improved tactile and visual appearance, while providing desired crush or bending characteristics. More specifically, the handle portion 20 is designed to bend or crush upon the application of a predetermined force, as may be encountered during a collision, and thus serves to absorb impact energy.

The first mounting member 22 is preferably integrally molded with the handle portion 20 and extends from a first end **20*a* of the handle portion 20 so as to define a longitudinal extension of the handle portion, as illustrated. In addition to providing a smooth and continuous extension of the handle portion 20, the first mounting member 22 includes a peripheral flange member 26, a plurality of vertical walls 28, 30, 32, and a lower, horizontal screw-receiving wall 34. The peripheral flange member 26 surrounds an opening 36 in the first mounting member 22 and smoothly blends with the handle portion 20, as illustrated. First and second vertical walls 28, 30 are disposed within the opening 36 and extend downwardly to the screw-receiving wall 34. The screw-receiving wall 34 defines a boss that an attachment screw 38 extends through. The first vertical wall 28 includes a distal end or finger 40 that extends vertically below the screw-receiving wall 34 and into an accommodating opening in the roof 13. When so positioned, the distal end 40 of the first vertical wall 28 not only serves to align the handle housing assembly 12, and more specifically, the screw 38, for installation, but also serves to stiffen connection between the handle housing assembly 12 and the vehicle roof 13**.

A third vertical 32 wall is also disposed in the opening 36 and cooperates with the second vertical wall 30 to support a cover attachment wall 42. More specifically, the cover 18 is designed to conceal the opening 36 in the first mounting member 22 and includes a recessed distal portion 18*a* and a downwardly extending attachment tab 18*b*. The recessed distal portion 18*a* is hooked under an edge of the peripheral flange member 26 surrounding the opening 36 while the attachment tab 18*b* is snap-fit through the cover attachment wall 42.

The second mounting member 24 is also preferably integrally molded with the handle portion 20 and extends from a second end 20*b* of the handle portion 20 so as to define a longitudinal extension of the handle portion, as illustrated. A peripheral flange 44 extends around the second mounting member 24 and the adjacent light receptacle 25 and defines a lens opening 46 that is covered by the lens 14, to be described hereinafter. The second mounting member 24 includes a plurality of vertical walls 48, 50, 52, 54, and a lower, horizontal screw-receiving wall 56.

The vertical walls include a forward wall 48 and a rearward wall 50 that are disposed on opposite ends of the screw-receiving wall 56. The screw-receiving wall 56 defines a boss that an attachment screw 58 extends through. The forward vertical wall 48 includes a distal end or finger 60 that extends vertically below the screw-receiving wall 56 and into an accommodating opening in the vehicle roof 13. When so positioned, the distal end 60 of the forward vertical wall 48 not only serves to align the housing assembly 12, and more specifically, the screw 58, for assembly, but also serves to stiffen connection between the handle assembly 12 and the vehicle roof 13.

As can be appreciated, the distal ends 40, 60 of the first vertical wall 28 and the forward vertical wall 48 cooperate to secure and support the grab rail assembly 10. It is noted in this regard that the first and second mounting members 22, 24 are asymmetric with regard to the length of the integrated grab rail and light assembly 10, with the first mounting member 22 being disposed near an end of the assembly 10 and the second mounting member 24 being disposed near a middle of the assembly 10. However, the first and second mounting members 22, 24 are disposed on opposite ends of the handle portion 20, which is the portion that requires support as it is pulled by the user. Other vertical walls 52, 54 are laterally spaced apart and receive therebetween a portion of a switch assembly 62 that is moved to actuate the light, as will be described further hereinafter.

The light receptacle 25 extends forwardly from the second mounting member 24 and is surrounded by the peripheral flange 44. A forward end of the light receptacle 25 receives a wiring harness socket 64, which provides electrical power to the light assembly 16 disposed within the light receptacle 25, as illustrated. In this regard it is noted that the vehicle roof conventionally includes a rigid steel, fiberglass, etc. structure that has a roof liner or headliner 13*a* secured to a lower surface thereof. The headliner 13*a* is preferably disposed between the integrated light and grab rail assembly and the roof 13, and is partially shown in FIG. 3.

A spacing wall 66 is provided by the light receptacle 25 relatively beneath the wiring harness connection. The spacing wall 66 extends through a cushioning material 68 (i.e., egg crate) that is disposed between a lower surface of the light receptacle 25 and the vehicle roof 13. As will be appreciated, the cushioning material 68 is positioned and adapted to absorb impact energy and helps keep light receptacle 25 from contacting the vehicle roof 13.

The light receptacle 25 and second mounting member 24 cooperate to define the lens opening 46 that receives the lens 14. The lens 14 simultaneously covers the light assembly 16 disposed in the light receptacle 25 (lens opening 46) and the attachment screw 58 disposed in the second mounting member 24. As will be appreciated by those skilled in the art from the following discussion, the lens 14 is pushed by the user to actuate the light assembly 16 disposed therebeneath.

More specifically, the light assembly 16 includes a frame 70, light bulb 72, a plug 74 that is received by the wiring harness socket 64, and the switch assembly 62. The frame 70 is snap-fittingly received in the light receptacle 25. The switch assembly 62 includes a plunger 76 that is engaged by the lower surface of the lens 14 when the lens is depressed by a user to actuate the switch assembly 62 and turn the light bulb 72 on or off. The switch assembly 62 is preferably of the push-on/push-off type so that the lens 14 is normally maintained in a flush relationship to the surrounding peripheral flange 44, and is pushed inwardly to activate/deactivate the light bulb 72.

The integrated light and grab rail assembly 10 of the present invention provides numerous advantages over the prior art. First, the asymmetric securement of the integrated light and grab rail assembly 10 to the roof 13 permits firm support of the handle portion 20 for its normal use by a vehicle occupant, while permitting the extending light receptacle 25 to better absorb impact energy during a collision. Moreover, the lattice-type structure of the handle portion 20 results in a stiff and stable handle portion that is adapted to crush or bend when confronted with a predetermined impact load. Having the lens 14 cover both the light assembly 16 and the screw 58 disposed in the second mounting member 24 reduces the time and labor required for assembly, and provides for convenient access to both the light bulb 72 and screw 58 for maintenance and assembly. The extending fingers 40, 60 provided by the first and second mounting members 22, 24 facilitate assembly and strengthen the connection between the ii integrated assembly 10 and the roof 13.

Although the present invention has been described with particularity herein, the present invention is not limited to the structural features specifically described herein. Rather, it is considered apparent that the present invention is capable of numerous modifications, rearrangements, and replacements of parts. For example, although the light assembly is preferably of the push-on/push-off type, this light assembly may be replaced by other equivalent light assemblies without departing from the scope and spirit of the present invention. Therefore, the present invention is only to be defined by the claims appended hereto.

What is claimed is:

1. In combination, a vehicle roof and an integrated grab rail and light assembly, said integrated grab rail and light assembly being adapted for securement to a vehicle roof, comprising:

a handle portion having a first end and a second end;

a first mounting member disposed at a first end of said handle portion;

a second mounting member disposed at a second end of said handle portion;

a light receptacle extending from said handle portion second end and receiving a light assembly; and, a cushioning material disposed between a lower surface of said light receptacle and the roof.

2. The combination according to claim 1, wherein said first and second mounting members are mechanically secured to the vehicle roof.

3. The combination according to claim 2, wherein said first mounting member is disposed near an end of said integrated grab rail and light assembly and said second mounting member is disposed near a middle of said integrated grab rail and light assembly.

4. The combination according to claim 1, further comprising a lens, said lens overlying said light assembly and said second mounting assembly.

5. The combination according to claim 4, wherein said lens is pushed to actuate said light assembly.

6. The combination according to claim 5, wherein a spacing wall extends downwardly from said light receptacle and into said cushioning material.

7. The combination according to claim 6, wherein said first mounting member includes a downwardly extending finger that extends into an opening in the roof and serves to position the first mounting member relative to the roof and stiffen the support of the integrated grab rail and light assembly.

8. The combination according to claim 7, wherein said second mounting member includes a downwardly extending finger that extends into an opening in the roof and serves to position the second mounting member relative to the roof and stiffen the support of the integrated grab rail and light assembly.

9. An integrated grab rail and light assembly that is adapted for securement to a vehicle roof, comprising:

a handle portion having a first end and a second end;

a first mounting member disposed at a first end of said handle portion;

a second mounting member disposed at a second end of said handle portion;

a light receptacle extending from said handle portion second end and receiving a light assembly; and, a cushioning material disposed adjacent a lower surface of said light receptacle and being adapted to absorb impact energy imparted to said light receptacle.

10. The integrated grab rail and light assembly according to claim 9, wherein said first mounting member is disposed near an end of said integrated grab rail and light assembly and said second mounting member is disposed near a middle of said integrated grab rail and light assembly.

11. The integrated grab rail and light assembly according to claim 9, further comprising a lens, said lens overlying said light assembly and said second mounting assembly.

12. The integrated grab rail and light assembly according to claim 11, wherein said lens is pushed to actuate said light assembly.

13. The integrated grab rail and light assembly according to claim 9, further comprising a spacing wall, said spacing wall extending from said light receptacle and into said cushioning material.

14. The integrated grab rail and light assembly according to claim 13, wherein said first mounting member includes a downwardly extending finger that serves to position the first mounting member and stiffen the support of the integrated grab rail and light assembly.

15. The integrated grab rail and light assembly according to claim 14, wherein said second mounting member includes a downwardly extending finger that serves to position the second mounting member and stiffen the support of the integrated grab rail and light assembly.

* * * * *